US00RE42634E

(19) United States
(12) Reissued Patent
Shaughnessy

(10) Patent Number: US RE42,634 E
(45) Date of Reissued Patent: Aug. 23, 2011

(54) SOUND MUFFLING MATERIAL AND METHOD OF MAKING THEREOF

(75) Inventor: Stephen James Shaughnessy, Winsford (GB)

(73) Assignee: Acousta-Fil Limited (GB)

(21) Appl. No.: 10/957,525

(22) PCT Filed: Nov. 4, 1998

(86) PCT No.: PCT/GB98/03284

§ 371 (c)(1),
(2), (4) Date: Jul. 10, 2000

(87) PCT Pub. No.: WO99/23367

PCT Pub. Date: May 14, 1999

Related U.S. Patent Documents

Reissue of:
(64) Patent No.: 6,457,555
Issued: Oct. 1, 2002
Appl. No.: 09/530,739
Filed: Jul. 10, 2000

(30) Foreign Application Priority Data

Nov. 4, 1997 (GB) ..... 9723148.4

(51) Int. Cl.
*E04B 1/84* (2006.01)

(52) U.S. Cl. ..... 181/294; 181/284; 181/285; 181/286; 181/290

(58) Field of Classification Search ..... 181/206, 181/294, 284, 285, 286, 290
See application file for complete search history.

(56) References Cited

U.S. PATENT DOCUMENTS

| | | | |
|---|---|---|---|
| 4,010,818 | A | 3/1977 | Westley |
| 4,104,426 | A | 8/1978 | Gonzalez |
| 5,266,143 | A | 11/1993 | Albera et al. |
| 5,290,522 | A | 3/1994 | Rogers et al. |
| 5,318,837 | A | 6/1994 | Yoshinaka et al. |
| 5,766,541 | A | 6/1998 | Knutsson et al. |
| 6,213,252 | B1 | 4/2001 | Ducharme |

FOREIGN PATENT DOCUMENTS

| | | |
|---|---|---|
| DE | 38 27 863 | 2/1990 |
| DE | 38 27 863 A1 | 2/1990 |
| GB | 0 434 895 | 6/1990 |
| GB | 0 434 895 A1 | 6/1990 |
| WO | WO 91/19082 | 12/1991 |

*Primary Examiner* — Kimberly R Lockett
(74) *Attorney, Agent, or Firm* — Salter & Michaelson

(57) ABSTRACT

A sound muffling material for use in combustion engine exhaust mufflers is provided. The material includes volumized fibers retained in compressed form by a material of lower softening temperature than the fibers. When the material is heated by exhaust gases, the material of lower softening temperature is softened allowing the compressed fibers to expand. The fibers may be formed into a knitted fabric retained by a sacrificial thread. The material may be used to support catalyst bricks.

44 Claims, 3 Drawing Sheets

SOUND MUFFLING MATERIAL AND METHOD OF MAKING THEREOF

Matter enclosed in heavy brackets [ ] appears in the original patent but forms no part of this reissue specification; matter printed in italics indicates the additions made by reissue.

The present invention relates to a sound muffling material. The material is intended particularly although not exclusively for use in mufflers and silencers fitted to internal combustion engine exhausts.

Exhaust mufflers generally include a sound muffling material, usually glass fibers. This material acts to attenuate sounds transmitted through the exhaust system. The fibers are usually disposed in at least a part of the muffler. The fibers generally fill a part of the muffler to a certain density to achieve an effective muffling effect. The fibers are usually in a volumized form.

In one existing arrangement an exhaust muffler includes a cylindrical steel body, usually referred to as a box, in which there is disposed coaxially a perforated steel tube. The perforated steel tube is mounted on annular end caps which are affixed to opposite ends respectively of the cylindrical body by welding or crimping. A muffling material, usually glass fibers, is disposed in the annular region between the perforated steel tube and the muffler body. In use exhaust gases are directed through one end cap, along the perforated tube, and out the opposite end cap.

Mufflers of this type are assembled in one of two common ways. Generally the muffler is assembled by attaching one end cap to support the perforated tube. In one method volumized continuous filament glass fibers are injected, through the open end of the muffler body, into the annular region between the perforated tube and muffler body using specialist equipment. In another method a glass fiber needlefelt fabric is provided wrapped around a cardboard tube, or former, of a similar diameter to the perforated metal tube in the muffler. The cardboard tube is positioned above the perforated tube and the cylinder of needlefelt fabric slid off the cardboard tube and onto the perforated tube.

There are a number of problems associated with both the above described methods. The equipment used to inject continuous filament fibers is expensive and therefore limits the number of mufflers that can be produced simultaneously at reasonable cost. When fibers are provided in the form of a needlefelt they are not necessarily continuous filament fibers. As such, when the muffler is used some fibers may pass through the perforated tube and into the flow of exhaust gases. This is undesirable as the effect of the muffler will be diminished and the escaping fibers may cause problems in the remainder of the exhaust system. Also, sliding a cylinder of needlefelt fabric onto a perforated tube is also inconvenient as the fabric tends to snag on the cut end of the perforated tube. Further, the cardboard tubes present a waste management problem. Often, the tubes are re-used which necessitates returning the tubes to the supplier, increasing transport costs.

By far the most significant drawback with conventional methods of filling mufflers with fibers is that where the fibers are loose, especially in the case of the preferred continuous filament fibers, and the muffler is filled with the required density of fibers this presents problems when the end cap is attached to the muffler. Where fibers stray out of the muffler body they may become trapped between the muffler body and the end cap. This adversely affects the quality of the join between the end cap and muffler body both when the end cap is attached by welding and crimping. It is therefore essential that before the end cap is attached to a muffler body the fibers disposed in the body are carefully moved from the region of the join. This is tedious and time consuming.

Another type of muffler is the clam shell type, which includes two portions which are crimped or welded together to form a complete unit. Mufflers of this type are produced in a variety of shapes and sizes, in general, however, each half is relatively shallow. The clam shell type of muffler cannot be easily filled with fibers using the above described methods as the fibers easily escape. Instead, short fibers are provided packed in, or continuous filaments injected into, perforated polythene bags. A bag of fibers is placed into one half of a clam shell muffler and the second half is welded or crimped to the first half. In use, high temperature exhaust gases cause the polythene bags to disintegrate, releasing the fibers. Again, there are problems associated with this technique. Firstly, the bags tend to be bulky in order to provide the correct density of fibers to fill the muffler. This makes joining the two halves of the muffler difficult. Secondly, where the bag is filled with short filament fibers problems are experienced with the fibers escaping from the muffler in use, as described above.

EP 0434895A discloses a silencer for an internal combustion engine comprising a hollow housing containing a web of fibers and a pipe extending therethrough. The web of fibers is confined by a plastics film and there is a substantial clearance space between the film and the housing. When the silencer has been connected with an internal combustion engine and is subjected to flow of hot exhaust gases from the engine the plastics film inside the silencer is destroyed so that it no longer confines the web of fibers.

DE 3827863A discloses an exhaust gas purification device which includes a resilient support mat. The resilient support mat is surrounded by a covering sheet such that it is compressed. In one arrangement overlapping marginal areas of the covering sheet are fixed together with blobs of adhesive which melts on heating to permit separation of the edges and expansion of the support mat.

WO 91/19082 discloses a protective material for a catalytic convertor block comprising a pad of fibrous material in an envelope of non-woven textile material. The envelope has its depth reduced in at least localized areas or positions by drawing together of opposing faces by stitching.

It is an object of the present invention to provide a convenient method of filling a muffler with fibers, particularly to enable continuous filament fibers to be easily used in clam shell type mufflers.

According to a first aspect of the present invention there is provided a sound muffling material comprising volumised continuous filament fibers retained in a compressed state in the form of a knitted or woven fabric with a density of at least 200 kg/m$^3$ by a material of lower softening temperature than the fibers, arranged so that the material of lower softening temperature will release the fibers when heated.

According to a second aspect of the present invention there is provided a sound muffling material comprising volumised continuous filament fibers retained in a compressed state in the form of a knitted or woven fabric with a density of at least 200 kg/m$^3$ by a material which breaks down at a lower temperature than the fibers, arranged so that the material of lower softening temperature will release the fibers when heated.

According to a third aspect of the present invention there is provided a method of making a sound muffling material comprising the steps of providing continuous filament fibers, volumising the fibers, providing a material with a lower softening temperature than the fibers, compressing the volumised fibers and retaining the volumized in a compressed state by means of the material of lower softening temperature by forming the volumized fibers into a knitted or woven fabric with a density of at least 200 kg/m$^3$.

According to a fourth aspect of the present invention there is provided a method of making a sound muffling material including the steps of providing continuous filament fibers, volumising the fibers, providing a material with a lower breakdown temperature than the fibers, compressing the volumized fibers and retaining the volumized in a compressed state by means of the material of lower breakdown temperature by forming the volumised fibers into a knitted or woven fabric with a density of at least 200 kg/m$^3$.

According to a fifth aspect of the present invention there is provided a method of filling an exhaust muffler with fibers including the steps of placing a material according to either of the first or second aspects of the present invention into an exhaust muffler and heating the material so as to release the fibers.

According to a sixth aspect of the present invention there is provided a method of mounting an exhaust catalyst brick comprising the steps of wrapping the brick in a material according to either of the first or second aspects of the present invention and heating the material so as to release the fibers.

The material is preferably adapted for insertion into an internal combustion engine exhaust muffler, including both domestic and commercial vehicles as well as industrial applications, for instance silencers used on gas turbine installations and during jet engine testing. The material may also be used for catalyst brick support in exhaust systems.

The fibers are preferably heat resistant and may include silica, glass, mineral or basalt man made fibers. The fibers preferably comprise e-glass (electrical glass) fibers. The fibers are also preferably resistant to exhaust gases.

The fibers are preferably resistant to thermal breakdown at temperatures up to 500° C., more preferably 1000° C., still more preferably 1100° C. or higher.

The average length of the fibers is preferably greater than 400 mm.

The fibers may be volumised by the process known as air texturising or volumizing.

The fibers may be volumized by using conventional compressed air operated volumizing equipment to separate the filaments in multi-filament strands or yarns, for example multiple fibre roving. The volume occupied by the fibers is preferably increased by at least a factor of ten. The fibers may also be texturized, again using conventional equipment, for example air-jet texturizing equipment.

The volumized heat resistant fibers are preferably retained, when in compressed form, so as to minimize their volume.

The volumized heat resistant fibers are preferably retained by an organic or synthetic material with a softening/melting point of lower temperature than that of exhaust gases, more preferably less than 200° C., still more preferably below 150° C. The retaining material preferably includes a fiber, for example a nylon polypropylene, polyethylene or polyester fiber. It is to be understood, however, that natural materials and fibers which breakdown at temperatures below the softening or breakdown temperature of the heat resistant fibers could be used, for example cotton fibers.

More generally the heat resistant fibers and retaining material are preferably chosen so that in use, for example in an exhaust muffler, the high temperature exhaust gases cause the retaining material to breakdown to release the heat resistant fibers. This allows mufflers and other equipment to be easily assembled with heat resistant fibers in a compressed form. As such the fibers take up a minimum of volume this overcomes the problem of stray fibers interfering with the assembly of the muffler and the difficulty associated with the insertion of bulky fibers into a muffler. When the muffler is first used the fibers are released and expand to fill the muffler in a desired manner.

In a preferred arrangement the heat resistant fibers are formed into a crochet or rochel knit fabric, retained by a lower melting point thread, for example a 'sacrificial' catch thread. The fabric may however take other forms, for example a woven fabric where the warp and weft include respectively heat resistant and heat softening fibers, or vice versa. Braided, twisted or netted methods of manufacture may also be used.

Fabrics according to the present invention may be configured so that upon the melting/breakdown of the retaining material the fabric expands in a predetermined manner. For example a strip of fabric may be arranged so that it will expand mainly in length and thickness but less so in width. This is a useful feature where the fabric is used in a cylindrically bodied muffler.

When the arrangement of fibers comprises a fabric it is preferable that that fabric has a density of at least *60 kg/m$^3$, more preferably 200 kg/m$^3$ and still more preferably* 400 kg/m$^3$, in compressed form, before softening/breakdown of the retaining threads.

When the arrangement of fibers is a fabric this may be produced continuously and cut into pieces of desired length. It is preferable that the ends of the fabric are secured to prevent fraying and premature expansion, for example by taping the ends of the fabric or using a thread lock adhesive. It is preferred that any tape or adhesive has a softening/thermal breakdown temperature of a similar order to the retaining material and in any event lower than that of the heat resistant fibers.

Portions of material of the present invention may be packed in plastic bags to aid handling. Such bags preferably breakdown on exposure to heat in exhaust systems.

The present invention provides an improved method of and muffling material for filling exhaust mufflers. The method dispenses with the need for the use of either expensive equipment or for cardboard formers or other packaging. As the fibers are provided in compressed form they take up less volume and are therefore considerably easier to insert into muffler boxes. As the fibers are retained they are also less likely to interfere with the closing of muffler boxes by crimping or welding.

Forming the fibers into a fabric provides the ability to control accurately the density of infill of muffler boxes and the like. They also allow a much higher overall fill density of fibers to be achieved than with conventional materials and methods.

Where continuous filament fibers are provided this reduces the tendency of fibers to escape into an exhaust system.

Fabrics may also be used as a catalyst support mat for catalyst brick support. Catalyst bricks cannot be welded. Fabrics can be used to retain catalysts in exhaust systems by wrapping the catalyst brick in a fabric, the wrapped catalyst brick is then placed in a part of an exhaust system, often similar to a muffler box.

Where fabrics according to the present invention are employed they can be arranged to expand on initial heating to firmly secure a catalyst brick in place and take account of the differential expansion of the catalyst brick and housing. This minimises any movement of the catalyst brick, caused, for example, by vibration of an exhaust system, and so prolongs catalyst life.

In order that the invention may be more clearly understood there axe now described embodiments thereof, by way of example and with reference to the accompanying drawings in which.

Figure 1:
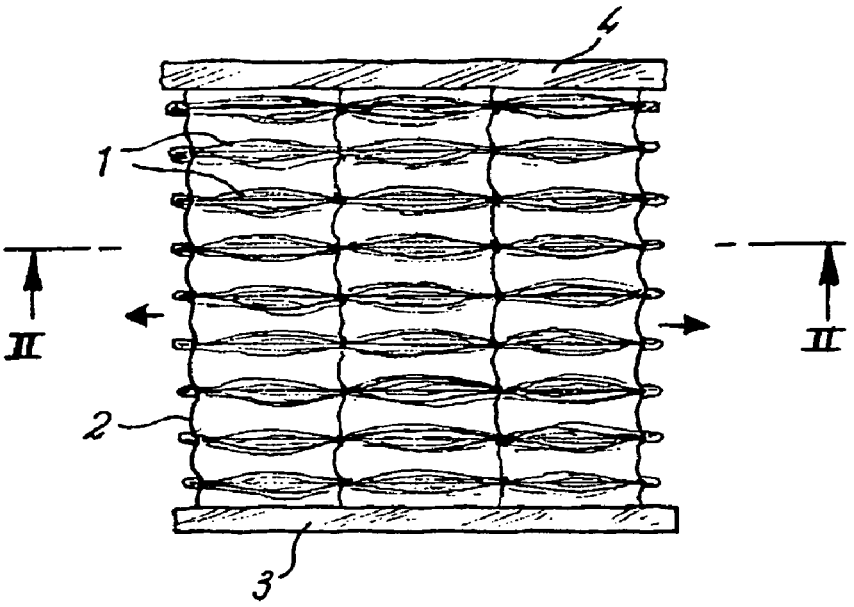
FIG. 1 shows a plan view of a fabric.
Figure 2:
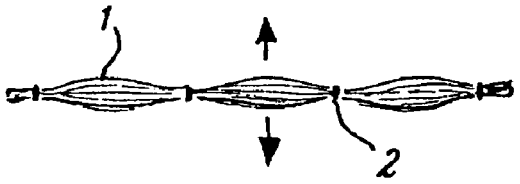
FIG. 2 shows a cross-section through the fabric illustrated in FIG. 1, taken along the line ll-ll.

Referring to FIGS. 1 and 2 there is shown a rochel knit fabric comprising e-glass fibers 1 retained by a polyethylene catch thread 2. The e-glass fibers 1 have been volumized, but are retained in compact form by the catch thread 2. The e-glass fibers 1 are in the form of continuous filament roving. Other knit or weave styles may be used provided that they enable volumised glass fibers to be retained by a fiber of lower softening point.

The fabric has been cut from a continuous length and ends 3 and 4 have been bound with a plastic tape to prevent fraying of the fibers. The fabric has a density of approximately 600 kg $m^3$.

In this form the portion of fabric may be wrapped in a polythene bag to reduce exposure of persons handling the material to the glass fibers which may act as a skin irritant.

The density of the fabric may be increased or decreased as required by altering the number of catch threads.

Figure 3:
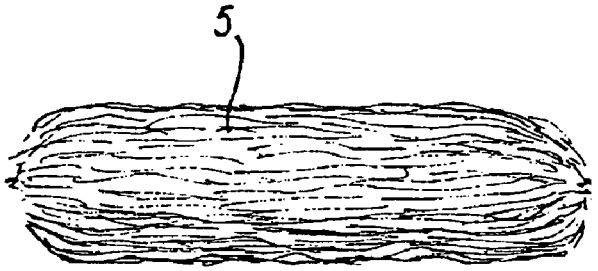
FIG. 3 shows a similar view to FIG. 2 of a similar fabric in expanded form.

FIG. 3 shows a similar fabric to that of FIGS. 1 and 2 following heating of the fabric to a temperature sufficient to soften the catch threads sufficiently to enable the volumized glass fibers to break free from the catch threads. When the fabric is so heated, as would occur in an exhaust system, it expands and considerably increases in volume. FIG. 3 shows expanded e-glass fibers 5, which have returned to their volumized form.

Figure 4:
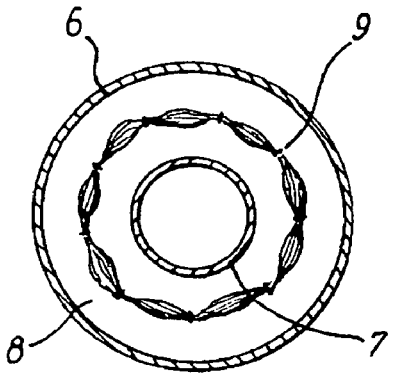
FIG. 4 shows a transverse cross-section through a cylindrically bodied exhaust muffler, containing a fabric in compressed form.

FIG. 4 shows a transverse cross-section through a cylindrical type exhaust muffler. The muffler includes a steel outer casing or box 6 and an inner perforated steel tube 7 which is disposed coaxially within the box 6.

For mufflers of this type to work effectively it is necessary that the annular region, generally indicated at 8 between the box 6 and the perforated tube 7 is filled with a relatively uniform density of heat resistant fibers.

Figure 5:
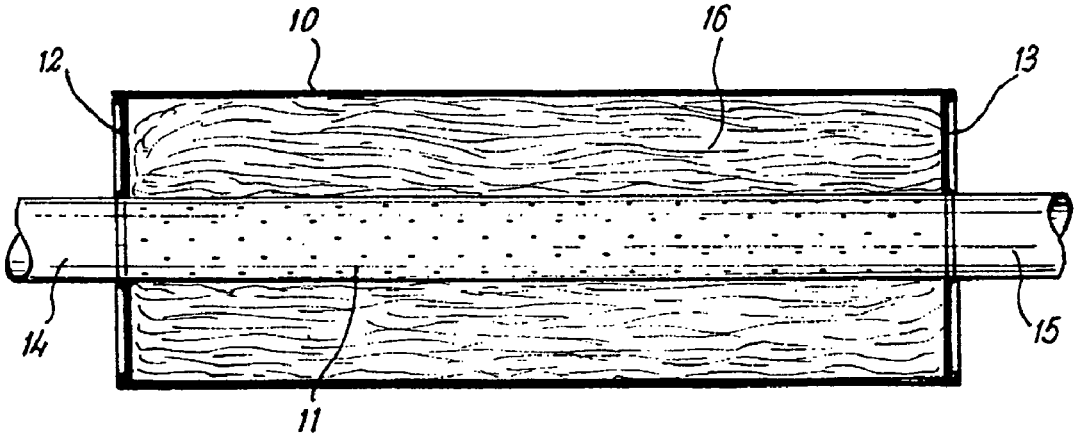
FIG. 5 shows a longitudinal cross-section through a similar muffler to that of FIG. 4, containing a fabric in expanded form.

A method of filling this region according to the invention is illustrated by FIGS. 4 and 5. FIG. 4 shows a fabric 9, similar to that illustrated in FIGS. 1 and 2, which has been placed into the annular region 8. The fabric fills only a small proportion of the volume of the annular region 8 and is therefore easy to insert. Further, as the fabric is compact and does not have fraying ends or stray fibers the fabric does not interfere with the open ends of the box 6 during its assembly.

FIG. 5 shows a transverse cross-section through a similar muffler to that illustrated in FIG. 4. Again, the muffler comprises a box 10 and an inner perforated tube 11. End caps 12 and 13 are affixed to opposite ends respectively of the box 10 and tube 11. The end caps 12, 13 close the box 10 and serve to support the tube 11 coaxially within the box 10. The end caps 12 and 13 are secured to both the box 10 and the tube 11 by welding. In use, the muffler is installed into an exhaust system by connecting pipes, shown partially at 14 and 15 to openings in the end caps so as to direct exhaust gases through the perforated tube 11.

FIG. 5 shows the effect of heating a fabric, similar to that indicated as 9 in FIG. 4, which is disposed in the annular region between the box 10 and tube 11. On heating the catch threads of the fabric have softened allowing the fabric to expand thereby filling the annular region surrounding the perforated tube 11 with glass fibers 16. As the fabric is only heated when the muffler is assembled the expansion of the fibers does not interfere with the assembly of the muffler and in particular with the attachment of the end caps 12, 13 to both the box 10 and perforated tube 11.

Figure 6:
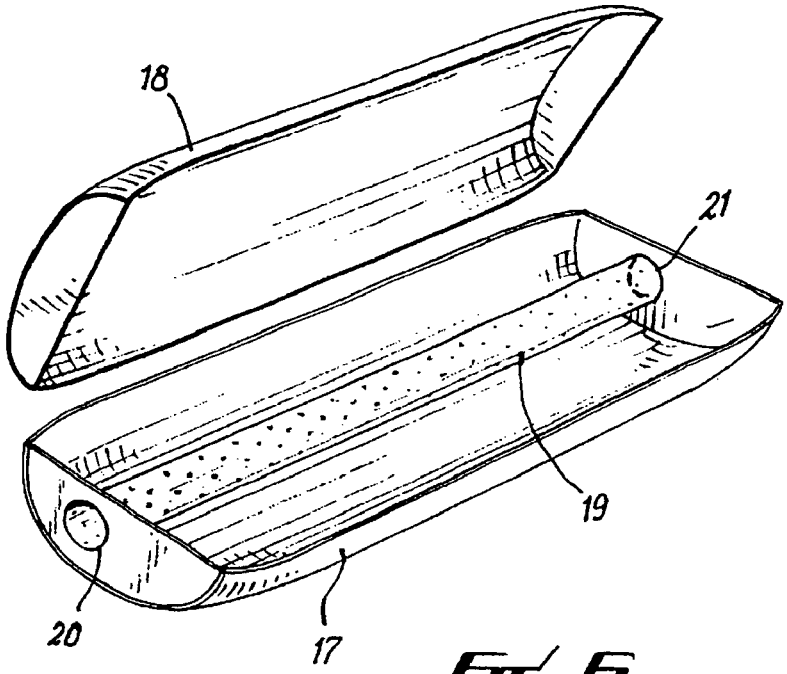
FIG. 6 shows an exploded perspective view of a clam shell type muffler.

FIG. 6 shows an alternative clam shell type of muffler, the body of which is formed from two parts, 17 and 18. Part 17 includes a perforated tube 19 connecting apertures 20 and 21 formed in part 17.

During assembly of this type of muffler it is necessary to fill the body of the muffler surrounding the perforated tube with a muffling material and then join the two portions of the muffler 17 and 18 by, for example, crimping or welding them together. It is difficult when assembling this type of muffler to keep the bulky muffling material away from the regions of the muffler body which must be joined by welding or crimping. This problem is solved by the present material and method. For example a fabric, such as that illustrated in FIGS. 1 and 2, may be placed into part of the muffler 17. The fabric is compact and will occupy only a small proportion of the muffler's volume and therefore will not interfere with the joining of the two portions of the muffler 17 and 18 together. When the muffler has been assembled and installed in an exhaust system and exhaust gases are fed through the muffler this will heat the fabric causing it to expand and evenly fill the muffler with fibers as required.

The present material and method provide a convenient and economical way of filling exhaust mufflers with fibers. Where cylindrical mufflers are concerned the need is nagated for specialist equipment for injecting fibers or for cardboard formers used to slide pre-formed needlefelt fabrics into the muffler. In particular the present material and method allow continuous filament fibers to be conveniently inserted into mufflers. Continuous filament fibers are preferred as they are less likely to escape from the muffler through perforations in the pipe conducting exhaust gas flow. Where clam shell type mufflers are concerned the present invention conveys a considerable advantage in that on insertion the muffling fibers are in compressed form and do not interfere with the assembly of the muffler. Only when the muffler has been completed and is used for the first time are the fibers distributed throughout the muffler body. Present methods do not allow the filling of clam shell type mufflers with continuous filament fibers.

Figure 7:
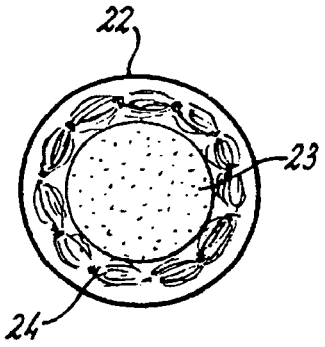
FIG. 7 shows a transverse cross-section through an exhaust catalyst containing a catalyst brick supported by a fabric.
Figure 8:
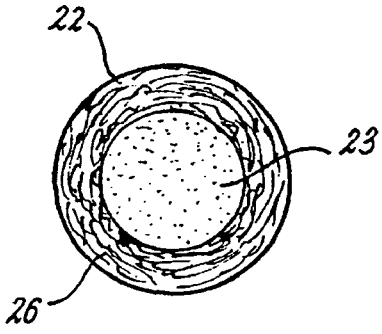
FIG. 8 shows a view similar to FIG. 7 where the fabric has been expanded.

Referring to FIGS. 7 and 8 another use for fabric according to the present invention is for catalyst brick support. FIGS. 7 and 8 show a transverse cross-section through a cylindrical box 22 in which a catalyst brick 23 is installed. FIG. 7 shows the arrangement as assembled. The catalyst brick 23 is supported by a rochel knit glass fiber fabric 24, with a nylon catch thread. The fabric 24 is wrapped around the brick 23.

FIG. 8 shows the same arrangement following heating of the fabric by passing exhaust gases through the arrangement. On heating, the catch threads of the fabric are softened allowing the glass fibers, which have previously been volumized, to expand filling the region surrounding the catalyst brick 23 with fibers 26. Following expansion of the fabric the fibers 26 hold the catalyst brick 23 firmly within the box 22 preventing movement of the catalyst brick 23. The fibers 26 also serve to insulate the catalyst brick 23 from the box 22. This allows the catalyst brick 23 to rapidly achieve its working temperature.

The above embodiments are described by way of example only and many variations are possible without departing from the invention.

What is claimed is:

1. A sound muffling material comprising volumized continuous filament fibers retained in a compressed state in the form of a knitted or woven fabric with a density of at least [200 kg/m$^3$] *60 kg/m$^3$* by a material of lower softening temperature than the fibers, arranged so that the material of lower softening temperature will release the fibers when heated.

2. A sound muffling material comprising volumized continuous filament fibers retained in a compressed state in the form of a knitted or woven fabric with a density of at least [200 kg/m$^3$] *60 kg/m$^3$* by a material which breaks down at a lower temperature than the fibers, arranged so that the material of lower softening temperature will release the fibers when heated, wherein the average length of the fibers is greater than 400 mm.

3. The sound muffling material according to claim 1 wherein the fibers comprise glass fibers.

4. The sound muffling material according to claim 1 wherein the fibers are resistant to thermal breakdown up to 1000° C.

5. The sound muffling material according to claim 1 wherein the fibers are retained by a material selected from the group consisting of nylon, polypropylene, polyethylene or polyester.

6. The sound muffling material according to claim 1 wherein the fibers are retained by a material with a softening or melting temperature below 200° C.

7. The sound muffling material according to claim 1 wherein the material of lower softening temperature than the fibers is itself a fiber.

8. The sound muffling material according to claim 1 wherein the material of lower softening temperature than the fibers is a sacrificial catch thread.

9. The sound muffling material according to claim 1 wherein the fabric has a density of at least 400 kg/m$^3$ in compressed form.

10. The sound muffling material according to claim 1 wherein the fabric has a density of the order of 600 kg/m$^3$ in compressed form.

11. [The] *A* method of filling an exhaust muffler with fibers comprising the steps of:

providing a material including volumized continuous filament fibers retained in a compressed state in the form of a knitted or woven fabric with a density of at least [200kg/m$^3$] *60 kg/m$^3$* by a material of lower softening temperature than the fibers, arranged so that the material of lower softening temperature will release the fibers when heated;

placing the material into an exhaust muffler; and heating the material so as to soften the retaining material to release the fibers, wherein the average length of the fibers is greater than 400 mm.

12. A method of filling an exhaust muffler with fibers, comprising the steps of:

providing a material including volumized continuous filament fibers retained in a compressed state in the form of a knitted or woven fabric with a density of at least [200kg/m$^3$] *60 kg/m$^3$* by a material which breaks down at a lower temperature than the fibers, arranged so that the material of lower softening temperature will release the fibers when heated;

placing the material into an exhaust muffler; and heating the material so as to cause the retaining material to breakdown to release the fibers, wherein the average length of the fibers is greater than 400 mm.

13. A method of mounting an exhaust catalyst brick, comprising the steps of:

providing a material including volumized continuous filament fibers retained in a compressed state in the form of a knitted or woven fabric with a density of at least [200kg/m$^3$] *60 kg/m$^3$* by a material of lower softening temperature than the fibers, arranged so that the material of lower softening temperature will release the fibers when heated:

wrapping the brick in the material; and heating the material so as to soften the retaining material to release the fibers.

14. A method of mounting an exhaust catalyst brick, comprising the steps of:

providing a material including volumized continuous filament fibers retained in a compressed state in the form of a knitted or woven fabric with a density of at least [200 kg/m$^3$] *60 kg/m$^3$* by a material which breaks down at a lower temperature than the fibers, arranged so that the material of lower softening temperature will release the fibers when heated:

wrapping the brick in the material; and heating the material so as to cause the retaining material to breakdown to release the fibers.

15. The method according to claim 13 further comprising the step of inserting the wrapped brick into a box, before heating the material.

16. A method of making a sound muffling material comprising the steps of providing continuous filament fibers, volumizing said fibers, providing a material with a lower softening temperature than the fibers, compressing said volumized fibers and retaining said volumized in a compressed state by means of the material of lower softening temperature by forming said volumized fibers into a knitted or woven fabric with a density of at least [200 kg/m$^3$] *60 kg/m$^3$*, wherein the average length of the fibers is greater than 400mm.

17. A method of making a sound muffling material comprising the steps of providing continuous filament fibers, volumizing said fibers, providing a material with a lower breakdown temperature than the fibers, compressing said volumized fibers and retaining said volumized in a compressed state by means of the material of lower breakdown temperature by forming said volumized fibers into a knitted or woven fabric with a density of at least [200 kg/m$^3$.] *60 kg/m$^3$*, wherein the average length of the fibers is greater than 400 mm.

18. The method according to claim 16 wherein the fibers are provided in the form of multi-filament strands.

19. [A] *The* method according to claim 18 wherein the multi-filament strands comprise multiple fibre roving.

20. The method according to 16 wherein the fibers are volumized using compressed air operated volumizing equipment.

21. The method according to claim 16 wherein the volumizing step increases the volume occupied by the fibers by at least a factor of ten.

22. The method according to claim 14 further comprising the step of inserting the wrapped brick into a box, before heating the material.

23. The method according to claim 17 wherein the fibers are provided in the form of multi-filament strands.

24. The method according to claim 17 wherein the fibers are volumized using compressed air operated volumizing equipment.

25. The method according to claim 17 wherein the volumizing step increases the volume occupied by the fibers by at least a factor of ten.

26. The sound muffling material according to claim 2 wherein the fibers comprise glass fibers.

27. The sound muffling material according to claim 3 wherein the average length of the fibers is greater than 400 mm.

28. The sound muffling material according to claim 2 wherein the fibers are resistant to thermal breakdown up to 1000° C.

29. The sound muffling material according to claim 2 wherein the fibers are retained by a material selected from the group consisting of nylon, polypropylene, polyethylene or polyester, and combinations thereof.

30. The sound muffling material according to claim 2 wherein the fibers are retained by a material with a softening or melting temperature below 200° C.

31. The sound muffling material according to claim 2 wherein the material of lower softening temperature than the fibers is itself a [fibre] *fiber*.

32. The sound muffling material according to claim 2 wherein the material of lower softening temperature than the fibers is a sacrificial catch thread.

33. The sound muffling material according to claim 2 wherein the fabric has a density of at least 400 kg/m$^3$ in compressed form.

34. The sound muffling material according to claim 2 wherein the fabric has a density of the order of 600 kg/m$^3$ in compressed form.

35. A sound muffling material comprising volumized continuous filament fibers retained in a compressed state in the form of a knitted or woven fabric with a density of at least [200kg/m$^3$] *60 kg/m$^3$* by a material of lower softening temperature than the fibers, arranged so that the material of lower softening temperature will release the fibers when heated, wherein the average length of the fibers is greater than 400 mm.

*36. The sound muffling material according to claim 1 wherein the fabric has a density of at least 200 kg/m$^3$ in compressed form.*

*37. The sound muffling material according to claim 2 wherein the fabric has a density of at least 200 kg/m$^3$ in compressed form.*

*38. The sound muffling material according to claim 11 wherein the fabric has a density of at least 200 kg/m$^3$ in compressed form.*

*39. The sound muffling material according to claim 12 wherein the fabric has a density of at least 200 kg/m$^3$ in compressed form.*

*40. The sound muffling material according to claim 13 wherein the fabric has a density of at least 200 kg/m$^3$ in compressed form.*

*41. The sound muffling material according to claim 14 wherein the fabric has a density of at least 200 kg/m$^3$ in compressed form.*

*42. The sound muffling material according to claim 16 wherein the fabric has a density of at least 200 kg/m$^3$ in compressed form.*

*43. The sound muffling material according to claim 17 wherein the fabric has a density of at least 200 kg/m$^3$ in compressed form.*

*44. The sound muffling material according to claim 35 wherein the fabric has a density of at least 200 kg/m$^3$ in compressed form.*

* * * * *